(12) United States Patent
Suzuki et al.

(10) Patent No.: US 6,524,216 B2
(45) Date of Patent: Feb. 25, 2003

(54) CONTROL APPARATUS OF HYBRID VEHICLE

(75) Inventors: Takehiko Suzuki, Anjo (JP); Masashi Hattori, Anjo (JP); Kazuo Takemoto, Anjo (JP); Satoru Wakuta, Anjo (JP); Takeshi Inuzuka, Anjo (JP)

(73) Assignee: Aisin Aw Co., Ltd. (JP)

( * ) Notice: Subject to any disclaimer, the term of this patent is extended or adjusted under 35 U.S.C. 154(b) by 0 days.

(21) Appl. No.: 09/953,230

(22) Filed: Sep. 17, 2001

(65) Prior Publication Data

US 2002/0035006 A1 Mar. 21, 2002

(30) Foreign Application Priority Data

Sep. 18, 2000 (JP) .......................................... 2000-282584

(51) Int. Cl.[7] ............................. F16H 61/00; B60K 6/02
(52) U.S. Cl. ............................... 477/3; 477/44; 180/65.2
(58) Field of Search ........................... 477/2, 3, 43, 44; 180/65.2; 701/51, 54

(56) References Cited

U.S. PATENT DOCUMENTS

| | | | | |
|---|---|---|---|---|
| 5,790,968 A | * | 8/1998 | Kashiwabara et al. | ........ 477/43 |
| 6,184,603 B1 | * | 2/2001 | Hamai et al. | ............... 180/65.2 |
| 6,233,508 B1 | * | 5/2001 | Deguchi et al. | ............ 180/65.2 |
| 6,359,404 B1 | * | 3/2002 | Sugiyama et al. | ......... 180/65.2 |

FOREIGN PATENT DOCUMENTS

JP 2000-23309 1/2000

* cited by examiner

*Primary Examiner*—Ankur Parekh
(74) *Attorney, Agent, or Firm*—Lorusso & Loud

(57) ABSTRACT

When a driver depresses an accelerator pedal to request a shift such as a downshift or the like, a maximum shift target changing rate (shift speed) of a CVT having a belt-type continuously variable shift apparatus is set based on the shift inertia of the CVT and the like. An assist torque is set by subtracting the normal torque of an internal combustion engine from a torque needed to achieve the maximum shift target changing rate. The assist torque and the torque outputtable from an electric motor based on the characteristic of the motor are compared. If the assist torque is greater than the motor torque, the target changing rate is restricted by an assist possible rate based on the ratio between the assist torque and the motor torque. The shift of the CVT is controlled by the target changing rate (shift speed). Thus, the apparatus allows a quick speed by assisting with a motor torque and, in a case where the assist torque from the motor is insufficient in quantity, allows a shift at a speed in accordance with the case, thereby resolving the degradation of acceleration feel caused by the shift inertia of the CVT.

18 Claims, 10 Drawing Sheets

SHIFT SPEED

SETTING OF TARGET CHANGING RATE

ASSIST TORQUE SETTING

MOTOR TORQUE CHARACTERISTIC

CONTROL APPARATUS OF HYBRID VEHICLE

BACKGROUND OF THE INVENTION

1. Field of the Invention

The invention relates to a hybrid vehicle having an internal combustion engine and an electric motor as drive power sources and having a continuously variable transmission as a transmission and, more particularly, to a control apparatus that performs torque assist using the electric motor at the time of a speed shift such as a downshift or the like.

2. Description of the Related Art

In vehicles (driven only by an internal combustion engine) equipped with a continuously variable transmission (hereinafter, referred to as "CVT") and, more particularly, a CVT having a belt-type continuously variable shift apparatus, the shift inertia is generally great due to the movement of a pulley that has a certain weight, securement of an oil pressure as a pulley pressing force, etc. Furthermore, the engine revolution speed is generally set so as to achieve a relatively low speed state where the fuel economy optimizes. Therefore, when a driver depresses a throttle (accelerator) pedal for a downshift, the engine torque reduces and the response and the output torque characteristic reduce due to the shift inertia and the low engine revolution speed setting mentioned above, so that the driver perceives an uncomfortable acceleration feel.

As described in Japanese Patent Application Laid-Open No. 2000-23309, a control apparatus of a hybrid vehicle having an internal combustion engine and an electric motor (motor generator) has been proposed. The control apparatus includes a CVT and a torque combining-distributing mechanism formed by a planetary gear unit. If there is a shift request for the CVT and there is an acceleration request, the control apparatus supplementally provides a margin torque needed for increasing the rotation speed inputted to the CVT by using a torque outputted from the motor during a shift transition of the CVT.

The above-described hybrid vehicle control apparatus is designed for a case where there is a downshift operation with the amount of accelerator operation exceeding 80[%] while a sports pattern, that is, a high speed with a high responsiveness, has been selected. In that case, since a torque greater than the maximum engine torque is needed, the control apparatus adds a torque corresponding to the difference from the torque determined by a movement locus of the engine operation point, by using the electric motor. Thus, the control apparatus is not intended to resolve the degradation of acceleration feel caused by the aforementioned great shift inertia of the CVT.

Moreover, in the above-described hybrid vehicle control apparatus, the shift speed of the CVT is set to a predetermined speed when there is a request for acceleration. The control apparatus is designed to compensate for a torque shortage at, the time of a downshift at the aforementioned shift speed by using the electric motor. That is, the control apparatus is designed for a hybrid vehicle equipped with a large electric motor having a sufficient margin. Thus, in the control apparatus, no consideration is made regarding a case where the assist torque from the motor cannot compensate for a torque shortage at the time of a downshift.

SUMMARY OF THE INVENTION

Accordingly, it is an object of the invention to provide a hybrid vehicle control apparatus that allows a quick speed by assisting with a torque from an electric motor and, in a case where the assist torque from the motor is insufficient in quantity, allows a shift at a shift speed in accordance with the case, thereby resolving the degradation of acceleration feel caused by the shift inertia of the CVT.

According to the invention, there is provided a hybrid vehicle control apparatus for a hybrid vehicle including an internal combustion engine and an electric motor as drive power sources and including a continuously variable transmission as a transmission for transferring a drive power to a drive wheel. The hybrid vehicle control includes means for setting a maximum shift target changing rate of the continuously variable transmission based on a shift request from an operating person, means for setting an assist torque needed for achieving the maximum shift target changing rate, means for comparing the assist torque and a torque outputtable by the electric motor, and means for restricting a target changing rate of the continuously variable transmission based on a ratio between the assist torque and the electric motor torque if the assist torque is greater than the electric motor torque.

The control apparatus of the invention operates, for example, in the following manner. That is, if a driver depresses an accelerator pedal to make a request for a shift, such as a downshift or the like, the maximum shift target changing rate (shift speed) of the continuously variable transmission (CVT), such as a belt-type continuously variable shift apparatus, is set based on the shift inertia of the CVT and the like. An assist torque is set by subtracting the normal torque of the internal combustion engine from the torque needed to achieve the maximum shift target changing rate. The assist torque is compared with the torque outputtable by the electric motor based on the characteristic of the motor. If the assist torque is greater than the motor torque, the target changing rate is restricted by an assist possible rate based on the ratio between the assist torque and the motor torque. With reference to the target changing rate (shift speed), the shifting of the CVT is controlled.

According to the above-described hybrid vehicle control apparatus of the invention, torque assist is performed by using the electric motor at the time of a shift operation of the continuously variable transmission, such as a downshift or the like, so that the uneasy feeling caused by reduction in response and output torque can be reduced or substantially avoided. If the output torque of the electric motor is less than the assist torque, the target changing rate is restricted by the ratio between the electric motor torque and the assist torque, so that the shift operation of the continuously variable transmission can be achieved at a shift speed corresponding to the electric motor output without causing ,an output torque reduction due to belt slip or the like. Thus, it becomes possible to provide a hybrid vehicle equipped with a relatively small-capacity electric motor.

In the hybrid vehicle control apparatus, the continuously variable transmission may have a belt-type continuously variable shift apparatus, and the maximum shift target changing rate may be set based on a shift inertia of the belt-type continuously variable shift apparatus.

Therefore, it becomes possible to apply the continuously variable transmission equipped with a highly reliable belt-type continuously variable shift apparatus to a hybrid vehicle and perform shifting without causing uneasy feeling. That is, the belt-type continuously variable shift apparatus has been put into practical use as a highly reliable continuously variable transmission. Furthermore, although the belt-type continuously variable shift apparatus has a relatively great shift inertia due to its construction, the maximum shift target changing rate is set by the shift inertia of the belt-type continuously variable shift apparatus in this invention.

Furthermore, in the hybrid vehicle control apparatus, the shift request from the operating person may be for a downshift.

Therefore, it becomes possible to perform a quick downshift due to the assist torque from the electric motor although a downshift is normally performed due to a sharp torque request from a driver and therefore requires a quick shift operation.

Still further, in the hybrid vehicle control apparatus, the continuously variable transmission may have a torque converter, and the electric motor may be contained together with the torque converter within a converter housing, and may be disposed on an outer peripheral portion of a front cover of the torque converter, and a rotor of the electric motor may be connected to the front cover and an output shaft of the internal combustion engine.

In this construction, the electric motor is disposed on an outer peripheral portion of the front cover of the torque converter, so that the electric motor can be disposed in a compact fashion. Hence, it becomes possible to dispose the electric motor in an installation space approximately equal the conventionally required space without a need to considerably modify a conventional transmission. Thus, it is possible to provide a hybrid vehicle without considerably changing the vehicle structure.

Still further, in the hybrid vehicle control apparatus, the continuously variable transmission may include a torque converter, a forward-reverse switching apparatus, and a primary pulley of the belt-type continuously variable shift apparatus that are disposed on a first axis A aligned with an output shaft of the internal combustion engine, and a secondary pulley of the belt-type continuously variable shift apparatus, and the electric motor may be disposed on a second axis B parallel to the first axis A.

In this construction, the electric motor is disposed on the second axis B (the secondary side) where there is a relatively large margin in the axis-direction dimension in a continuously variable transmission having a belt-type continuously variable shift apparatus. Therefore, it is possible to provide a compact hybrid vehicle in which increases in dimensions are prevented particularly in the direction of the axis.

Further, in the hybrid vehicle control apparatus, the electric motor may be a motor generator.

Since the electric motor is a motor generator, the electric motor is able to serve not only as a motor for assisting the internal combustion engine but also as a generator for performing electric charging when energy regeneration during braking is possible or when the internal combustion engine has a reserve capacity. Furthermore, the electric motor can also be used as a starter motor to start the internal combustion engine. Therefore, it is possible to improve fuel economy and achieve cleaner exhaust gas.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 7($b$) is a diagram indicating a characteristic of the electric motor;

DETAILED DESCRIPTION OF PREFERRED EMBODIMENTS

Figure 1:
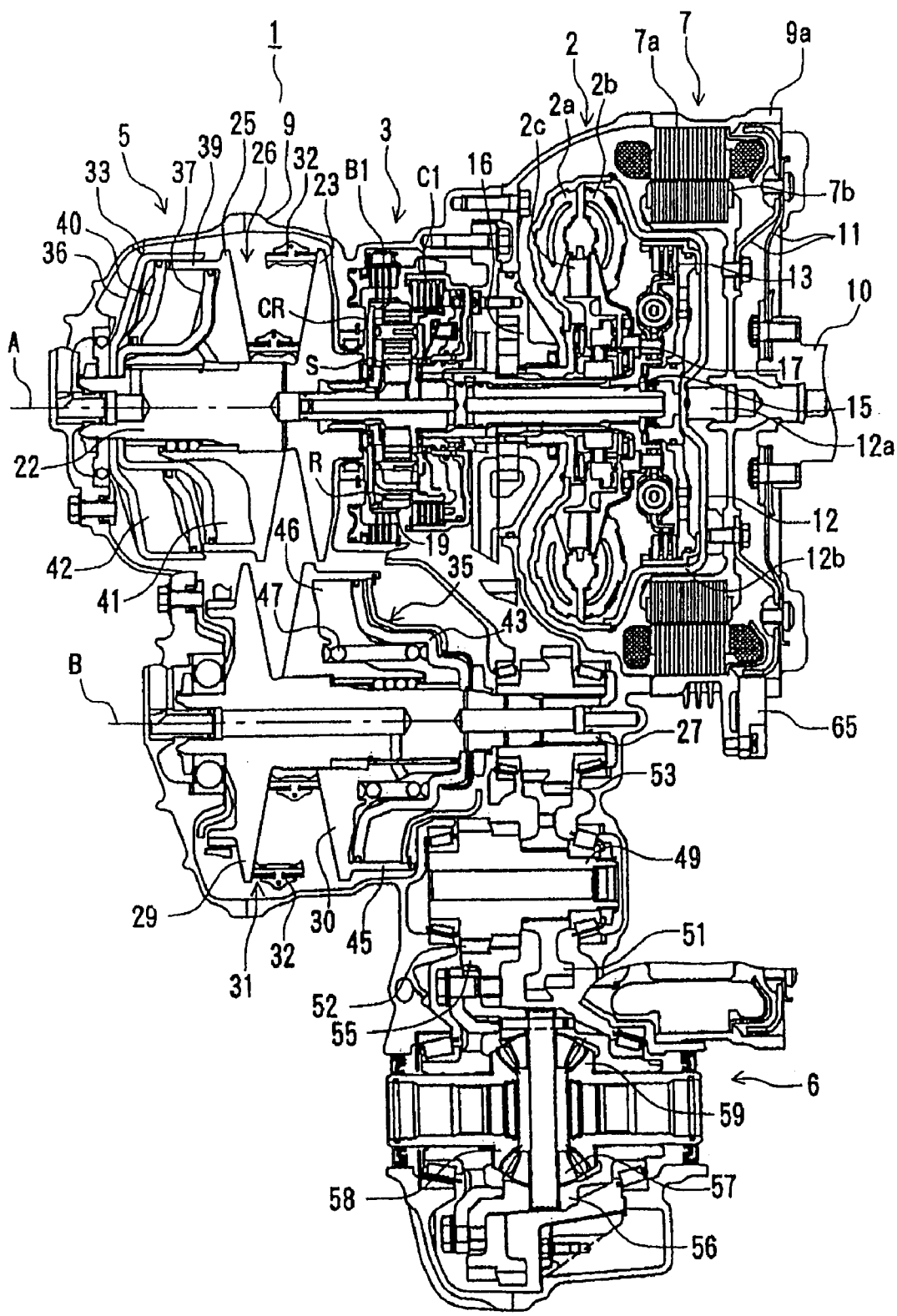
FIG. 1 is a developed sectional view illustrating a continuously variable transmission containing an electric motor to which the invention is applicable.
Figure 2:
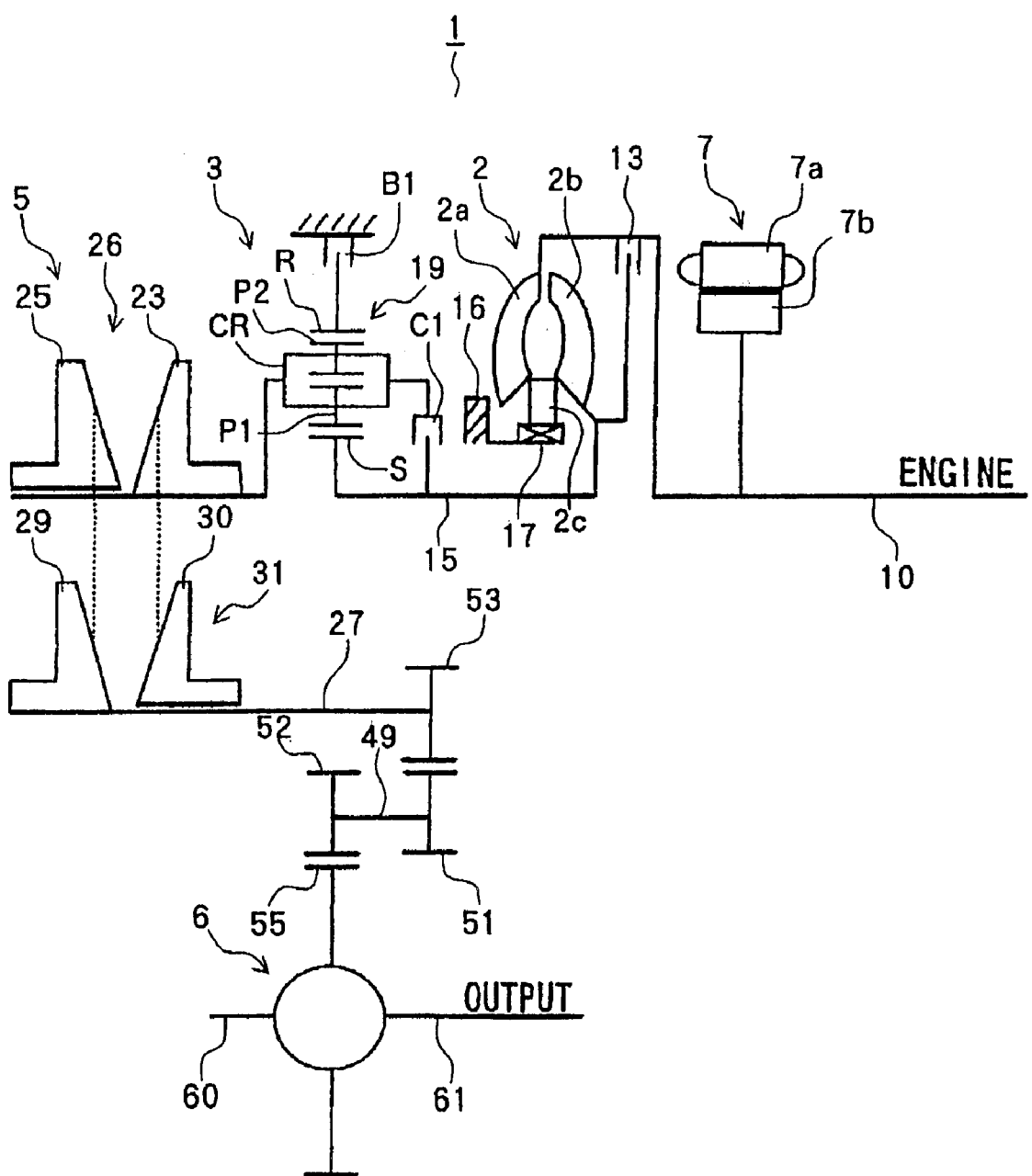
FIG. 2 is a skeleton diagram schematically illustrating the continuously variable transmission.

Embodiments of the invention will be described hereinafter with reference to the drawings. FIG. 1 is an overall sectional view of a transmission to which a control apparatus in accordance with the invention is applicable. FIG. 2 is a skeleton diagram of the transmission. In FIG. 1, reference numeral 1 represents a continuously variable transmission (CVT) of a hybrid vehicle. The CVT 1 includes a belt-type continuously variable transmission having a torque converter 2, a forward-reverse switching apparatus 3, a belt-type continuously variable shift apparatus 5, and a differential apparatus 6, and a relatively small-size electric motor (motor generator) 7 attached to the belt-type continuously variable transmission. The CVT 1 is contained in an integral case 9 formed by divided case portions, and is connected to an internal combustion engine (only an output shaft 10 shown, and other portions of the engine not shown). The CVT 1 is approximately the same as a conventional CVT, except a portion of the torque converter 2 where the electric motor 7 is installed. The torque converter 2, the forward-reverse switching apparatus 3, a primary pulley 26 of the belt-type continuously variable shift apparatus 5, and the motor generator 7 are disposed on a first axis A aligned with the internal combustion engine output shaft 10. A secondary pulley 31 of the belt-type continuously variable shift apparatus is disposed on a second axis B parallel to the first axis A.

The motor generator 7 (hereinafter, referred to simply as "motor") may be any electric motor such as a direct-current motor, an alternating-current motor, etc. Preferably, the motor 7 is a brushless DC motor. The motor 7 has a stator 7$a$ fixed to a case 9, and a rotor 7$b$ connected to the engine output shaft 10 via flexible drive plates 11. The rotor 7$b$ is connected to a front cover 12 of the torque converter 2, and is supported in a floated manner astride the engine output shaft 10 and a center piece 12$a$ of the cover 12. An intermediate stage of the front cover 12 of the torque converter 2 has a stepped structure extending in a direction of the axis. The motor 7 is disposed on an outside diameter side (outer peripheral portion) of the stepped portion 12b. A lockup clutch 13 formed by a multi-plate clutch is disposed in the inside of the front cover 12, that is, an inside diameter side of the stepped portion 12b.

That is, the motor 7 and the torque converter 2 are contained in a converter housing 9a that forms the integral case 9. The motor 7 and the lockup clutch 13 are disposed so as to overlap each other. The motor 7 is disposed in an outside diameter portion of the converter housing 9a, and has a large diameter. Therefore, it is possible to use a relatively small-size motor that is compact, particularly, in terms of the dimension in the direction of the axis, and that has a predetermined torque capacity. Thus, inconveniently increased dimensions of the converter housing 9a in the direction of the axis are prevented. Therefore, it becomes possible to install the CVT 1 within an installation space substantially equal to a conventionally required installation space although the CVT 1 includes the motor 7. As a result, a hybrid vehicle can be provided without considerable modifications to a conventional internal combustion engine-driven vehicle.

As for the torque converter 2, a pump impeller 2a and an input portion of the lockup clutch 13 are connected to the front cover 12, and therefore is connected to the engine output shaft 10 and the rotor 7b of the motor 7 which are connected with the front cover 12. A turbine runner 2b and an output portion of the lockup clutch are connected to an input shaft 15. Furthermore, a stator 2c of the torque converter 2 is connected to a case of an oil pump 16 fixed to the case 9, via a one-way clutch 17.

The forward-reverse switching apparatus 3 has a double-pinion planetary gear 19, a reverse (reverse drive) brake B1, and a direct clutch (a forward drive clutch or an input clutch) C1. As for the double-pinion planetary gear 19, a sun gear S is connected to the input shaft 15, and a carrier CR supporting first and second pinions $P_1$, $P_2$ is connected to the primary pulley 26 of the belt-type continuously variable shift apparatus 5. A ring gear R of the planetary gear 19 is connected to the reverse brake B1. The direct clutch C1 is disposed between the carrier CR and the ring gear R.

The belt-type continuously variable shift apparatus 5 includes the primary pulley 26 formed by a stationary sheave 23 fixed to a primary shaft 22 and a movable sheave 25 supported on the shaft in such a manner as to allow the movable sheave 25 to slide only, the secondary pulley 31 formed by a stationary sheave 29 fixed to a secondary shaft 27 and a movable sheave 30 supported on the shaft in such a manner as to allow the movable sheave 30 to slide only, and a metallic belt 32 disposed on the two pulleys.

A hydraulic actuator 33 having a double-piston construction is disposed at a back of the primary-side movable sheave 25. Another hydraulic actuator 35 having a single-piston construction is disposed at a back of the secondary-side movable sheave 30. The primary-side hydraulic actuator 33 has a reaction support member 37 and a cylinder member 36 fixed to the primary shaft 22, and a piston member 40 and a tubular member 39 fixed to the movable sheave 25. A first oil pressure chamber 41 is formed by the tubular member 39, the reaction support member 37 and the back surface of the movable sheave 25. A second oil pressure chamber 42 is formed by the cylinder member 36 and the piston member 40. The first oil pressure chamber 41 and the second oil pressure chamber 42 communicate with each other via a communication hole. Thus, the primary-side hydraulic actuator 33 produces force in the direction of the axis in a magnitude that is approximately twice the magnitude of force produced by the secondary-side hydraulic actuator 35 with equal oil pressures. The secondary-side hydraulic actuator 35 has a reaction support member 43 fixed to the secondary shaft 27, and a tubular member 45 fixed to the back surface of the movable sheave 30. These two members form a single oil pressure chamber 46. A pre-loading spring 47 is disposed in a compressed state between the movable sheave 30 and the reaction support member 43.

A counter shaft 49 is rotatably supported on the case 9, between the secondary shaft 27 and the differential apparatus 6. A large gear 51 and a small gear 52 are fixed to the counter shaft 49. The large gear 51 meshes with a gear 53 fixed to the secondary shaft 27. The small gear 52 meshes with a gear 55 of the differential apparatus 6. As for the differential apparatus 9, rotation of a differential gear 57 supported on a differential case 56 having the gear 55 is transferred to left and right axels 60, 61 via left and right side gears 58, 59. It is illustrated in FIG. 1 that each of the gears 51–55 has two kinds of gears of different diameters.

Operation of the above-described hybrid vehicle will now be described. If a driver depressed the accelerator pedal with an intention to start the vehicle (a small throttle opening state) when the vehicle is in a stopped state and the ignition switch is in an on state, current from a battery (not shown) flows through the motor generator 7, so that the motor generator 7 functions as a motor. Rotation of the rotor 7b of the motor generator 7 is transferred to the torque converter 2 via the front cover 12, and is then transferred to the input shaft 15 with a predetermined torque ratio increase.

At this vehicle starting time, the fuel injection apparatus is in a stopped state, and the engine is in a stopped state. More specifically, although the engine output shaft 10 is rotated via the drive plates 11 by rotation of the rotor 7b, the engine is in an idle running state in which the piston merely compresses air in the cylinder chamber and releases it. That is, at the vehicle starting time, the vehicle is started and run smoothly with a predetermined torque based on the drive characteristic of the brushless DC motor 6 that outputs high torque at low rotation speeds, and a high torque ratio due to the torque ratio increase achieved by the torque converter 2 and the under-drive state of the CVT 1.

If the throttle is operated to at least a predetermined amount of operation while the vehicle is at a relatively low predetermined speed immediately after the starting, the fuel injection apparatus is actuated and ignition is performed the spark plug. Thus, the motor generator 7 functions as a starter motor to drive the internal combustion engine. Therefore, rotation of the output shaft 10 of the internal combustion engine is transferred to the input shaft 15 via the drive plates 11 and the torque converter 2. In this state, the drive power from the internal combustion engine and the drive power of the motor generator 7 functioning as a motor are combined and transferred to the torque converter, and the CVT 1 is upshifted or downshifted, so that torque is is transferred to the drive wheels at a desired rotation speed. That is, if a great drive power is needed, for example, during a vehicle accelerating state, a hill-climbing state or the like, a drive power of the motor generator 7 is added as an assist to the drive power of the internal combustion engine, so as to run the vehicle with high power.

In particular, if a driver requests a torque (acceleration) by depressing the accelerator pedal, the belt-type continuously variable shift apparatus 5 of the CVT 1 expands the primary pulley 26 (increases the effective pulley diameter), and narrows the secondary pulley 31 (reduces the effective pulley diameter), thereby quickly accomplishing a downshift. At this moment, the belt-type continuously variable shift apparatus 5 needs a great assist torque from the motor generator 7 in order to maintain a pull-in torque overcoming a great shift inertia required by the belt-type continuously variable shift apparatus 5 (described in detail below).

Then, when the vehicle reaches a steady high-speed running state, the motor generator 7 is put into a no-load operation (where the motor output is controlled so as to cancel the torque caused by a counter electromotive force that occurs in the motor), so that the motor generator is idled and the vehicle is run by drive power from the internal combustion engine alone. Depending on the amount of charge (SOC) of the battery, the motor generator 7 is operated as a generator to charge the battery. The lockup clutch 13 is connected by a change to the direction of converter pressure when the vehicle is driven by the internal combustion engine, or is driven by the internal combustion engine with an assist from the motor (or driven only by the motor in some cases). As a result, torque transferred to the front cover 12 is directly transferred to the input shaft 15 via the lockup clutch 13, without intervention of oil currents in the torque converter.

If the output of the internal combustion engine is provided with a margin due to a steady low-intermediate running state, a downhill running state, etc., the motor generator 7 is operated as a generator to charge the battery in accordance with the SOC of the battery. In particular, if engine braking is requested during a downhill run, the regenerative power from the motor generator 7 serving as a generator is increased so that a sufficient engine brake effect can be achieved. If a driver depresses a foot brake to request a stop of the vehicle, the regenerative power from the motor generator 7 is further increased so that the motor generator 7 operates as a regenerative brake. Thus, vehicle's inertia energy is regenerated as electric power, and the energy dissipation in the form of heat due to friction braking is reduced. Within an intermediate speed region, the motor generator 7 can be set into a regenerative state so as to allow the engine to operate in a higher-power and higher-efficiency region. Thus, the engine efficiency can be improved, and the motor running can be increased based on the charging of the battery achieved by the aforementioned regeneration. Therefore, the energy efficiency can be improved.

During a state where the vehicle is stopped for a traffic signal or the like, the motor generator 7 is stopped, and the fuel injection apparatus is turned off, so that the internal combustion engine is stopped as well. That is, the engine idling state according to the conventional art is eliminated. As for the vehicle start from the stopped state, the vehicle is first started by the motor drive power from the motor generator 7. During an immediately following relatively low speed state, the engine is started by the motor drive power. Due to the assist with drive power from the motor 7, the engine is smoothly operated with sharp drive power fluctuation of the engine being eliminated. Then, when engine braking is needed or at the time of a braking stop, the motor generator 6 is used as a regenerative brake to regenerate vehicle's inertia energy in the form of electric energy. Furthermore, in a low-engine efficiency region, for example, at the time of a low engine load, a very low load, or the like, the vehicle is run by the motor. Owing to the combination of the above-described operations, the hybrid vehicle is able to achieve economized fuel consumption and reduced exhaust gas.

Figure 3:
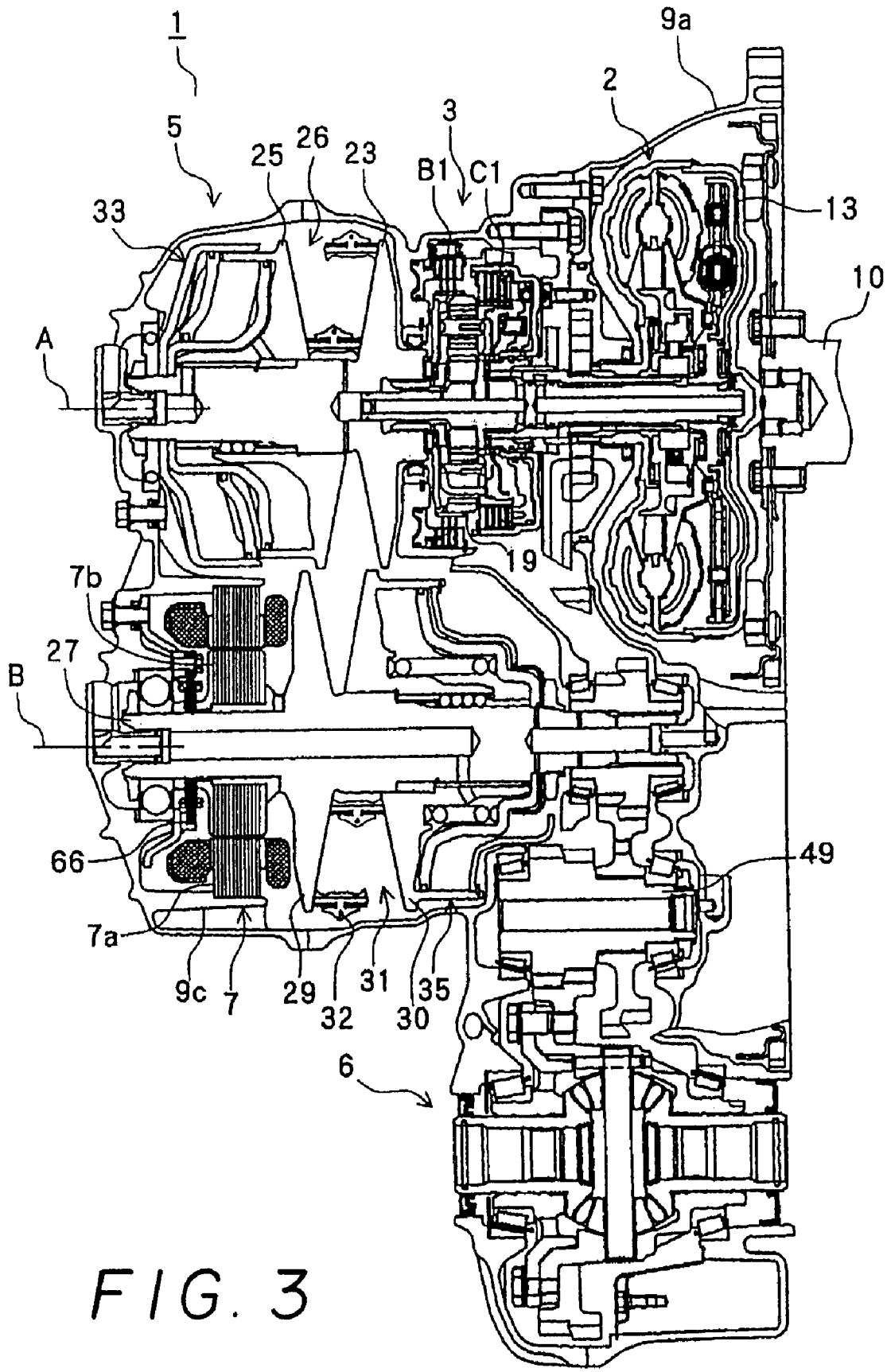
FIG. 3 is a developed sectional view illustrating a continuously variable transmission in accordance with another embodiment.

FIG. 3 is a sectional view of a partially modified CVT. This CVT 1 is different from the CVT in the foregoing embodiment in the position where the motor 7 is disposed, and is substantially the same as the CVT in the foregoing embodiment in the other respects, which are represented by the same reference characters, and will not be described again. That is, in the CVT 1, the motor 7 is disposed on a second axis B located on the secondary pulley 31-side of the belt-type continuously variable shift apparatus 5.

The motor generator 7 is formed by a brushless DC motor or the like. A stator 7*a* of the motor 7 is a collar portion 9*c* protruded from an integral case 9. A rotor 7*b* of the motor 7 is fixed and supported to a secondary shaft 27. Therefore, since a converter housing 9*a* is not provided with a motor unlike the foregoing embodiment, the torque converter 2 used in this modification is substantially the same as a conventional torque converter. Reference numeral 65 in FIG. 1 and 66 in FIG. 2 represent sensors for detecting the rotational position (phase) of the rotor 7*b* of the motor. The sensor 65 is a magnetic sensor capable of detecting the engine revolution speed. The sensor 66 is a resolver capable of detecting the output rotation speed.

The control apparatus, which is a gist of the invention, more specifically, a control of the assist torque from the motor at the time of a downshift, will be described.

Figure 4:
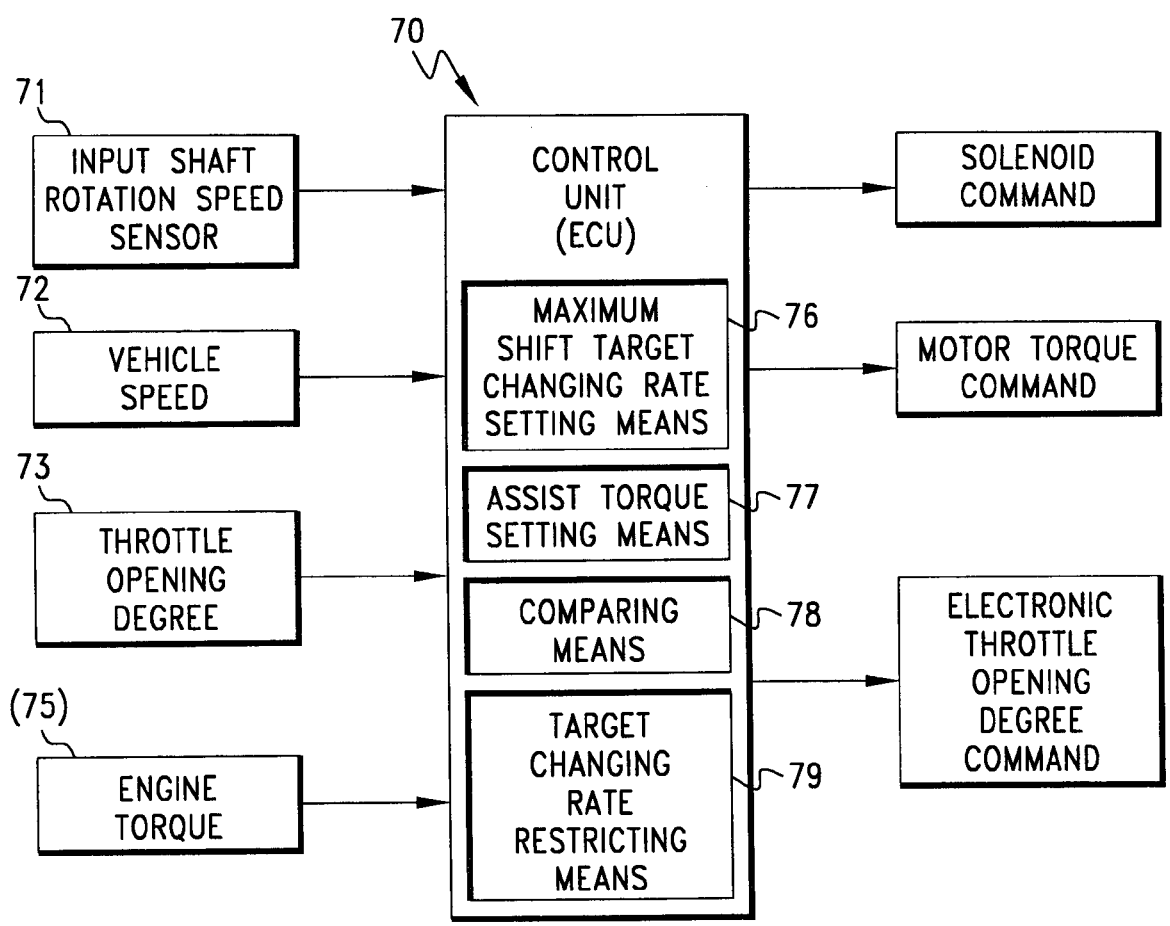
FIG. 4 is a block diagram illustrating a control apparatus in accordance with the invention.

FIG. 4 is a block diagram of the control apparatus. An electronic control unit (ECU) 70 receives inputs of signals from an input shaft rotation speed sensor 71 that is a sensor for detecting the rotation speed of the input shaft 15 of the CVT 1 and therefore the rotation speed of the primary pulley 26, a sensor 72 for detecting the vehicle speed, that is, the rotation speed of the secondary pulley 31, a sensor 73 for detecting the amount of depression of the accelerator pedal so as to recognize the intention of a driver, that is, the degree of throttle (accelerator) opening, and an engine torque 75, that is, an engine torque calculated based on the degree of throttle opening and the engine revolution speed detected by the sensors, or an engine torque value from an in-vehicle LAN (CAN), etc. The control unit 70 includes a means 76 for setting a maximum shift target changing rate of the CVT 1 based on the shift request from a driving person, a means 77 for setting an assist torque needed to achieve the maximum shift target changing rate, a means 78 for comparing the assist torque and the torque outputtable by the electric motor 7, and a means 79 for, if the assist torque is greater than the electric motor torque, restricting the target changing rate of the CVT 1 based on the ratio between the assist torque and the electric motor torque.

The control unit 70 outputs a solenoid command, a motor torque command, an electronic throttle opening degree command, etc. The solenoid command is for controlling a solenoid valve that operates a ratio control valve (not shown) that controls the pressure in the primary-side oil chambers 41, 42. Upon the solenoid command, the belt-type continuously variable shift apparatus 5 is upshifted or downshifted. The motor torque command is outputted to a controller of the electric motor 7 so as to control the output torque of the motor. The electronic throttle opening degree command is for controlling the engine output by controlling the amount of fuel injected into the internal combustion engine.

Figure 5:
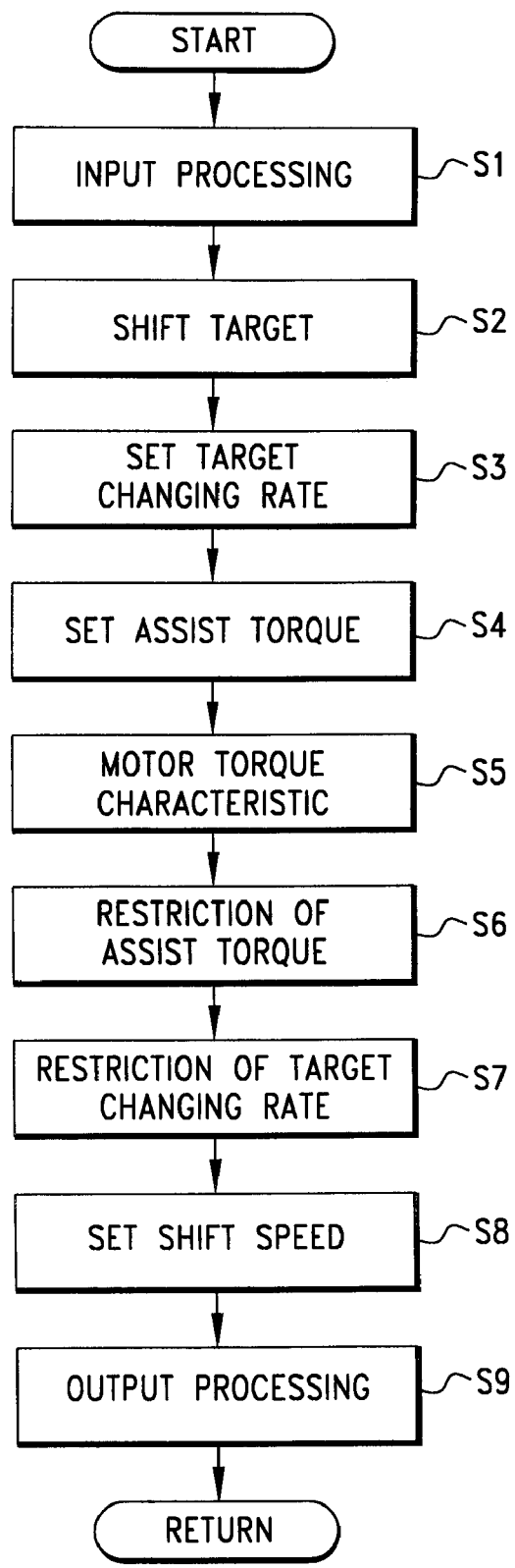
FIG. 5 is a diagram showing a flowchart regarding the control apparatus.
Figure 6A:
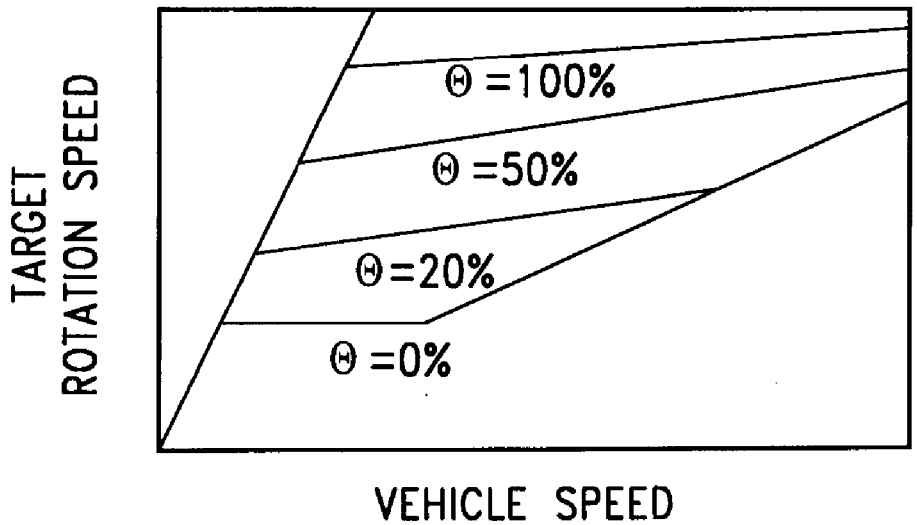
FIG. 6($a$) and FIG. 6($b$) are diagrams indicating maps for setting the shift target and the target changing rate, respectively.
Figure 7A:
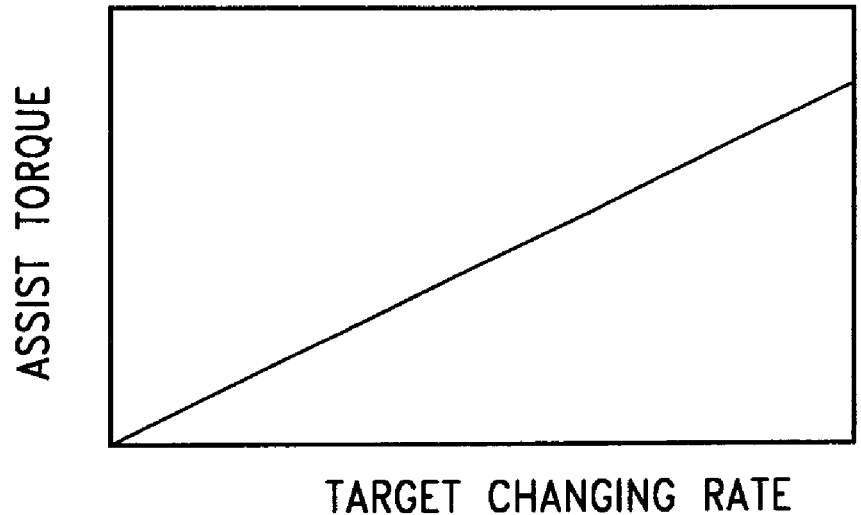
FIG. 7($a$) is a diagram indicating a map for setting an assist torque.
Figure 7B:
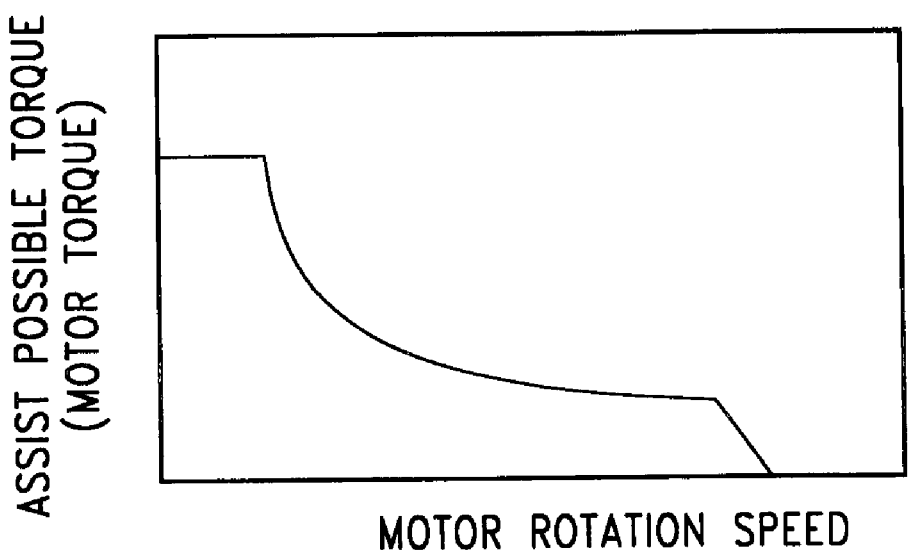
Figure 8:
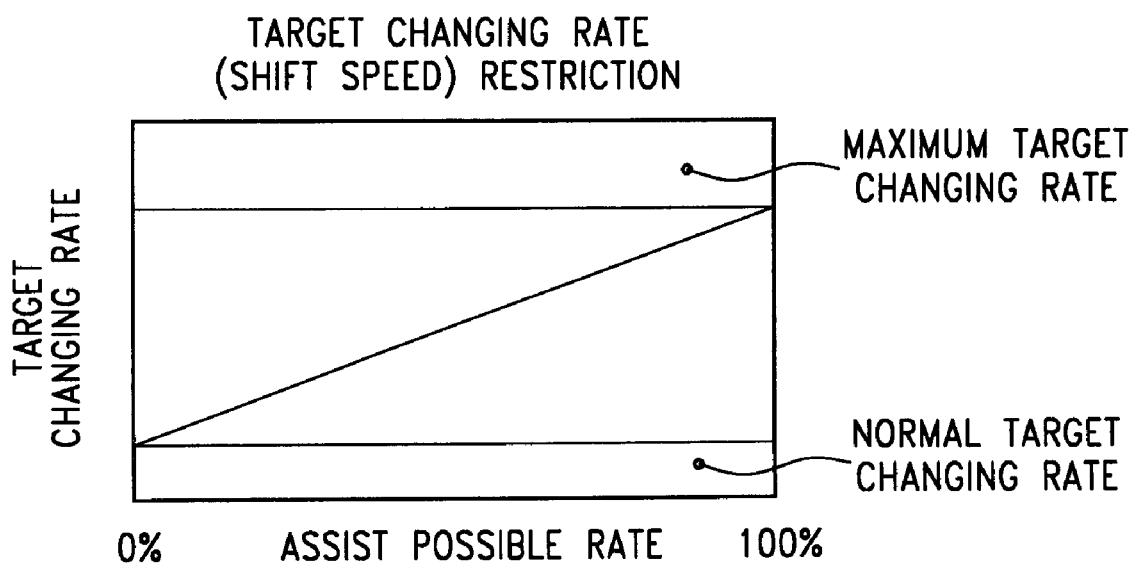
FIG. 8 is a diagram indicating a map for restricting the target changing rate (shift speed) by the assist possible rate.

The control apparatus will be more specifically described with reference to the flowchart of FIG. 5, the diagrams (maps) of FIGS. 6 to 8, and the time charts of FIGS. 9 and 10. First, the input processing shown in step S1 in FIG. 5 is performed, and then a shift target is set (S2). As for the shift target, a target input rotation speed (steady target rotation speed), that is, a targeted transmission speed ratio of the belt-type continuously variable shift apparatus 5, is set as indicated in FIG. 6(a). For example, an engine revolution speed is determined such that an optimal fuel economy characteristic where the fuel consumption becomes the least with respect to the requested power (target output) of the vehicle will be realized. This engine revolution speed is used as a target input rotation speed. More specifically, the aforementioned steady target rotation speed is set in every control cycle of the flowchart of FIG. 5.

Figure 6B:
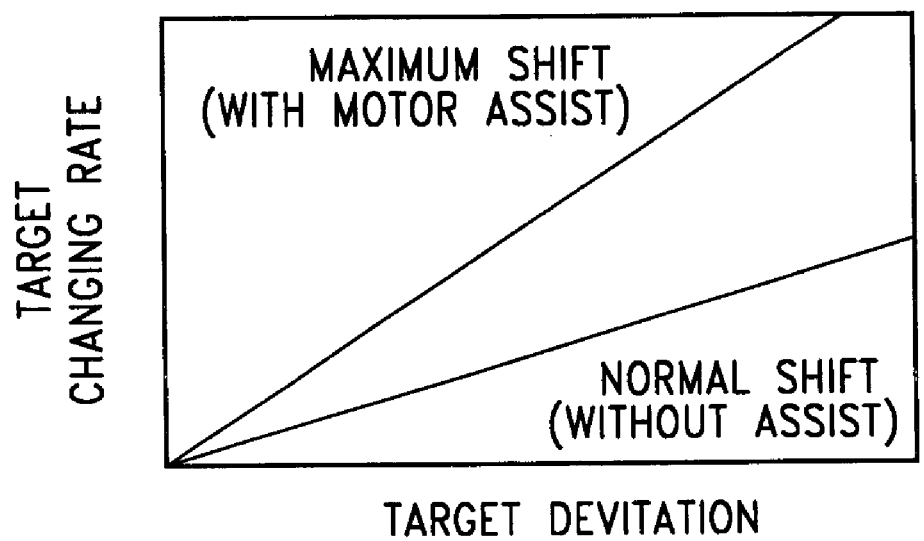

Subsequently in step S3, a target changing rate is set. As indicated in FIG. 6(b), a target changing rate, that is, a targeted shift speed, is set from a deviation of the present transmission speed ratio and the target transmission speed ratio based on the aforementioned target rotation speed, on the basis of a pre-set maximum shift speed (target changing rate) line and a pre-set normal shift speed (target changing rate) line. The maximum shift line indicates a functionally allowable maximum shift speed (changing rate) that enables the belt-type continuously variable shift apparatus to maintain a belt pull-in torque overcoming the relatively great shift inertia thereof. The normal shift line indicates the shift speed (changing rate) allowed by the drive power of the engine alone. More specifically, if a value obtained by adding a target changing rate to the transitional target rotation speed of the previous cycle is set as a transitional target rotation speed, the target deviation becomes equal to a value obtained by subtracting the transitional target rotation speed from the steady target rotation speed.

Subsequently in step S4, an assist torque is set. As indicated in FIG. 7(a), an assist torque (Ta) needed at the time of a maximum speed shift is set based on a target changing rate that is given by a difference between the maximum shift line and the normal shift line. That is, of the shift inertia torque corresponding to the target changing rate of the maximum shift, an assist torque that needs to be supplementally provided besides the engine torque is set.

Furthermore, in step S5, a motor output torque is determined from the motor torque characteristic of the electric motor 7. A maximum torque outputtable by the electric motor, that is, a maximum torque (Tm) that can be provided as an assist torque by the motor, is determined from the motor torque characteristic indicated in FIG. 7(b), on the basis of the motor rotation speed as same with the present revolution speed of the output shaft 10 of the engine.

Subsequently in step 6, the assist torque Ta set in step S4 and the assist possible torque (motor torque) Tm determined in step S5 are compared. If the motor torque is greater than the assist torque (Tm>Ta), the electric motor 7 outputs the assist torque needed for the shift operation at the maximum shift changing rate, so that the assist for the shift operation is performed. Conversely, if the assist possible torque (motor torque) Tm is smaller than the assist torque Ta (Tm<Ta), the assist torque is re-set so as to equal the assist possible torque. That is, the assist torque Ta is limited to the assist possible torque Tm [Ta=MIN (Ta, Tm)], and the ratio (assist possible rate) Ra between the assist possible torque Tm and the assist torque Ta is calculated [Ra [%]=(Tm/Ta)×100].

Furthermore, in step S7, the target changing rate (shift speed) is restricted based on the assist torque re-set as described above. As shown in FIG. 8, a target changing rate restricted by the assist possible rate (ratio) Ra calculated as described above is re-set based on a line passing between the maximum target changing rate determined from FIG. 6(b) and the normal changing rate achieved without the motor.

Subsequently in step 8, the shift speed of the belt-type continuously variable shift apparatus 5 is calculated from the restricted target changing rate, and is processed for output as the solenoid command and the motor torque command (S9) (see FIG. 4). Specifically, the shift speed is calculated from the target deviation and the integral of the follow-up deviation, that is:

(shift speed)=(factor 1)×[(target deviation)×(factor 2)+Σ{(follow-up deviation)×(factor 3)}]

where (transitional target rotation speed)=(transitional target rotation speed of the previous cycle)+(target changing rate) (target deviation)=(steady target rotation speed)−(transitional target rotation speed) (follow-up deviation)=(transitional target rotation speed)−(primary rotation speed)

Operation of the above-described control apparatus will be further described with reference to the time charts of FIGS. 9 and 10. FIG. 9 is a chart indicating a case (normal) where there is no assist with motor torque and a case where there is an assist with motor torque. When a driver depresses the accelerator pedal, the degree of throttle opening is increased so that a downshift signal is outputted (control is started). The downshift shift speed, that is, the shift speed of the belt-type continuously variable shift apparatus 5 with the primary pulley 26 being expanded and the secondary pulley being narrowed (i.e., the pulley moving speed), smoothly rises upon the shift control start signal and smoothly ends due to the shift inertia in the case where there is no assist torque as indicated by a dotted line. In the case where there is motor assist, however, the shift inertia is absorbed by the assist torque, so that the downshift shift speed rises substantially vertically upon the shift start signal, and the shift ends in a short time, as indicated by a solid line.

Therefore, the transmission speed ratio more quickly reaches a predetermined transmission speed ratio if there is motor assist (solid line) than if there is no motor assist (dotted line). Correspondingly, the engine revolution speed is quickly raised. Furthermore, the input torque to the torque converter exhibits a predetermined amount of rise based on the degree of throttle opening if only the internal combustion engine is used (without motor assist), as indicated by a one-dot chain line (as is the case with a normal state indicated by a dotted line). However, if a motor torque is added (engine +motor torque), a sharply rising torque can be obtained. The difference between the two cases is the assist torque from the motor.

The output torque slowly increases from the start of control to the end of control if there is a normal control by the engine alone, since the downshift shift speed is slow corresponding to the belt pull-in torque. However, if there is no torque assist from the motor during a state of maximum shift of the belt-type continuously variable shift apparatus, the shift inertia cannot be absorbed and the torque becomes insufficient thereby causing a slip state where an output torque is not provided (engine racing). After that, a state of output torque based on the shift is brought about. Thus, a considerably uneasy feeling is given to the driver. In contrast, if there is assist with a motor torque, the assist torque compensates for the belt pull-in torque, so that the output torque rapidly increases corresponding to the belt maximum shift, thereby accomplishing a quick downshift without casing an uneasy feeling.

Figure 9:
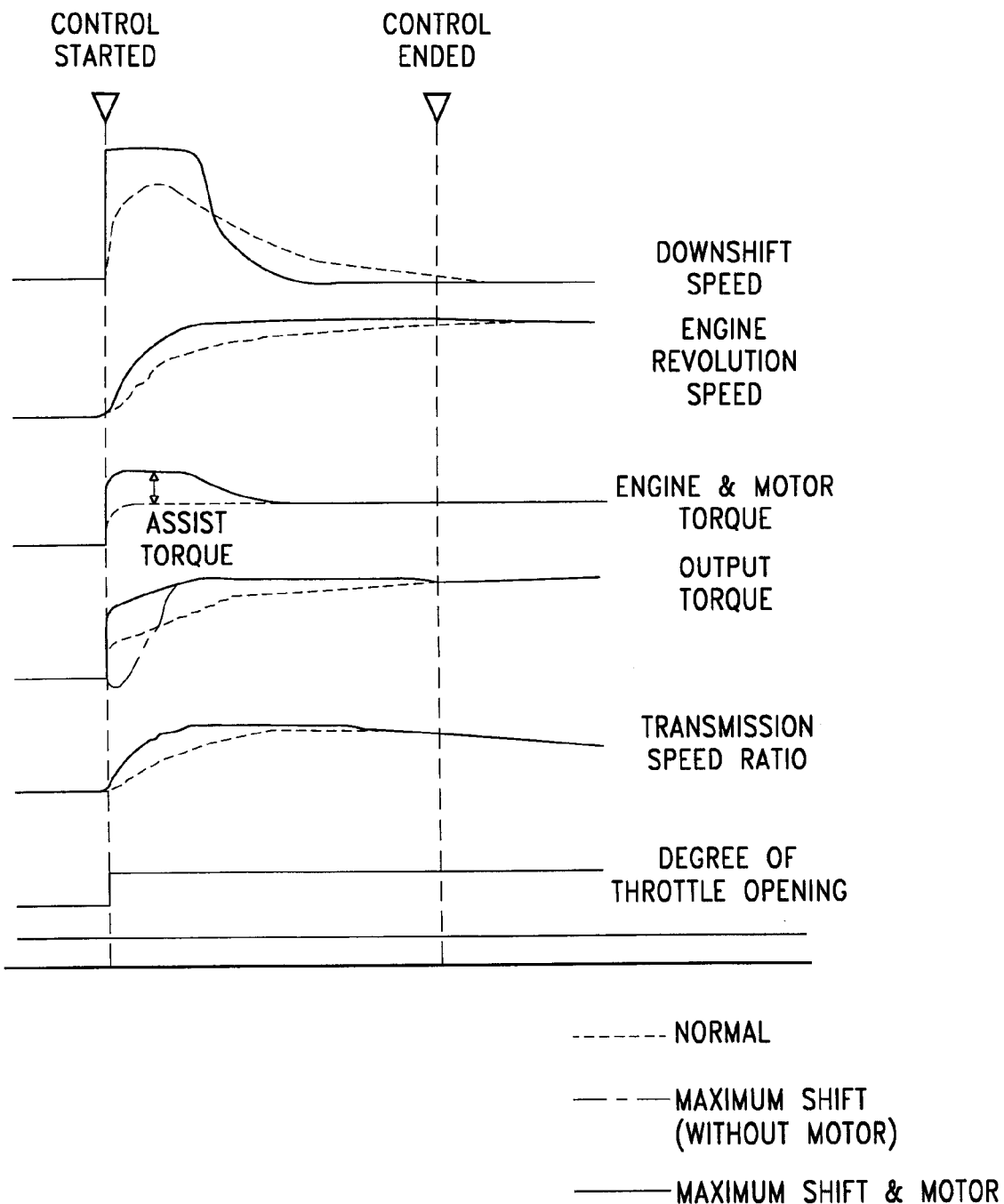
FIG. 9 is a diagram illustrating, in the form of a time chart, comparison between a downshift time with the internal combustion engine alone being used (normal) and a state where there is assist with motor torque.
Figure 10:
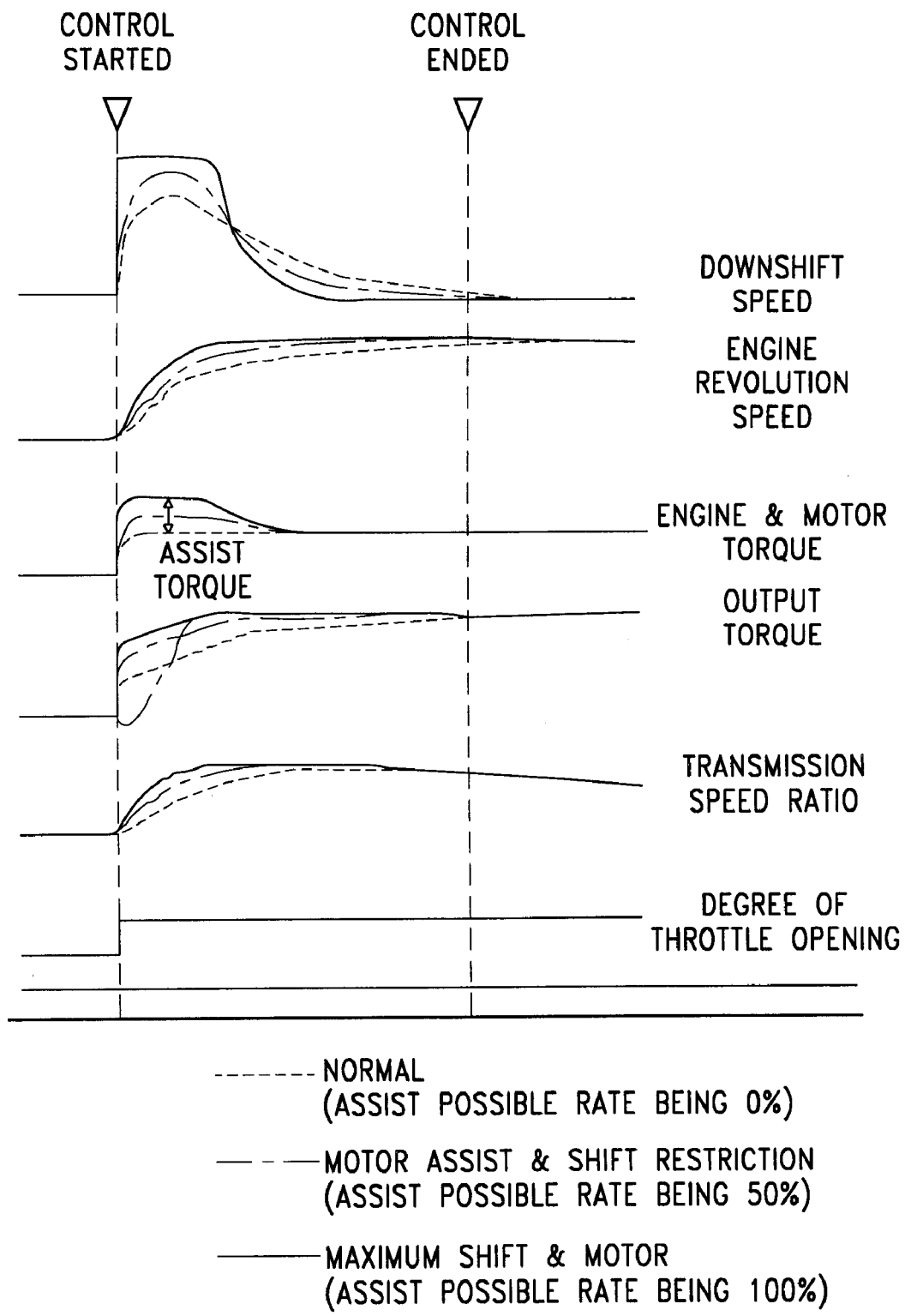
FIG. 10 is a diagram illustrating, in the form of a time chart, states of a downshift depending on the assist possible rate.

FIG. 10 is a chart indicating differences in the various values depending on the assist possible rate, wherein the downshift control is started with an increase in the degree of throttle opening as in FIG. 9. As indicated by dotted lines in FIG. 10, if the assist possible rate is zero, that is, if only the internal combustion engine is used, the downshift shift speed, the engine revolution speed, the input torque (engine +motor torque), the output torque and the transmission speed ratio are the same as in the normal case indicated in FIG. 9. If the assist possible rate is 100[%], that is, if the assist with a motor torque is possible with in the entire range with respect to the maximum shift, the downshift shift speed, the engine revolution speed, the input torque (engine+motor torque), the output torque and the transmission speed ratio are the same as in the case of maximum shift+motor indicated in FIG. 9. If the motor torque capacity is insufficient with respect to the assist torque and therefore the assist torque is restricted (motor assist+shift restriction); more specifically, if the assist possible rate is 50[%],the aforementioned factors assume intermediate values between the values in the case of the assist possible rate being 0[%] and the value in the case of the assist possible rate being 100[%], as indicated by a one-dot chain line.

If torque assist for a downshift is performed within a region of engine revolution speed where the amount of ejection from the oil pump is not sufficient, a sufficient belt clamping force can not be obtained due to the insufficient amount of ejection from the oil pump, thus posing a danger of belt slip. Therefore, it is conceivable to restrict the assist torque or retard the timing of assist if the maximum assist torque calculated from the torque of the internal combustion engine and the transferable allowable input torque calculated from the belt clamping force is less than the assist possible torque determined from the motor rotation speed.

A downshift caused by depression of the accelerator pedal (kick-down) needs-a rapid change (shift) of the belt-type continuously variable shift apparatus. Therefore, this is a suitable case for application of the above-described motor torque assist control. Instead of the assist with motor torque or in addition to the motor torque assist, it is also conceivable to increase the engine output (torque) at the time of a shift, such as a downshift or the like, upon an electronic throttle opening degree command.

As for continuously variable transmissions (CVT), many transmissions equipped with belt-type continuously variable shift apparatuses are presently put into practical use, and this type of transmission has a great shift inertia. Therefore, this is a suitable case for application of the motor torque assist control in terms of reliability and function. However, the invention is not limited to this case, but may also be applied in similar manners to other types of CVT such as a toroidal type CVT and the like.

As for internal combustion engines, the invention is applicable to not only gasoline engines but any internal combustion engine such as a diesel engine or the like. Furthermore, although the foregoing embodiments employ a motor generator as an electric motor, it is also possible to employ a motor that simply converts electric energy into mechanical rotations. Still further, although the electric motor is contained within the CVT 1, the invention may also be applied to a construction in which an electric motor is disposed separately from a CVT.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In, addition, while the various elements of the disclosed invention are shown in various combinations and configurations, which are exemplary, other combinations and configurations, including more, less or only a single embodiment, are also within the spirit and scope of the invention.

What is claimed is:

1. A hybrid vehicle control apparatus for a hybrid vehicle including an internal combustion engine and an electric motor as drive power sources and including a continuously variable transmission as a transmission for transferring a drive power to a drive wheel, the hybrid vehicle control comprising:

means for setting a maximum shift target changing rate of the continuously variable transmission based on a shift request from an operating person;

means for setting an assist torque needed for achieving the maximum shift target changing rate;

means for comparing the assist torque and a torque outputtable by the electric motor; and means for restricting a target changing rate of the continuously variable transmission based on a ratio between the assist torque and the electric motor torque if the assist torque is greater than the electric motor torque.

2. A hybrid vehicle control apparatus as defined in claim 1, wherein the continuously variable transmission has a belt-type continuously variable shift apparatus, and the maximum shift target changing rate is set based on a shift inertia of the belt-type continuously variable shift apparatus.

3. A hybrid vehicle control apparatus as defined in claim 2, wherein the shift request from the operating person is for a downshift.

4. A hybrid vehicle control apparatus as defined in claim 3, wherein the continuously variable transmission has a torque converter, and wherein the electric motor is contained together with the torque converter within a converter housing, and is disposed on an outer peripheral portion of a front cover of the torque converter, and a rotor of the electric motor is connected to the front cover and an output shaft of the internal combustion engine.

5. A hybrid vehicle control apparatus as defined in claim 4, wherein the electric motor is a motor generator.

6. A hybrid vehicle control apparatus as defined in claim 3, wherein the electric motor is a motor generator.

7. A hybrid vehicle control apparatus as defined in claim 2, wherein the continuously variable transmission has a torque converter, and wherein the electric motor is contained together with the torque converter within a converter housing, and is disposed on an outer peripheral portion of a front cover of the torque converter, and a rotor of the electric motor is connected to the front cover and an output shaft of the internal combustion engine.

8. A hybrid vehicle control apparatus as defined in claim 7, wherein the electric motor is a motor generator.

9. A hybrid vehicle control apparatus as defined in claim 2, wherein the continuously variable transmission includes a torque converter, a forward-reverse switching apparatus, and a primary pulley of the belt-type continuously variable shift apparatus that are disposed on a first axis aligned with an output shaft of the internal combustion engine, and wherein a secondary pulley of the belt-type continuously variable shift apparatus, and the electric motor are disposed on a second axis parallel to the first axis.

10. A hybrid vehicle control apparatus as defined in claim 9, wherein the electric motor is a motor generator.

11. A hybrid vehicle control apparatus as defined in claim 2, wherein the electric motor is a motor generator.

12. A hybrid vehicle control apparatus as defined in claim 1, wherein the shift request from the operating person is for a downshift.

13. A hybrid vehicle control apparatus as defined in claim 12,
wherein the continuously variable transmission has a torque converter, and
wherein the electric motor is contained together with the torque converter within a converter housing, and is disposed on an outer peripheral portion of a front cover of the torque converter, and a rotor of the electric motor is connected to the front cover and an output shaft of the internal combustion engine.

14. A hybrid vehicle control apparatus as defined in claim 13, wherein the electric motor is a motor generator.

15. A hybrid vehicle control apparatus as defined in claim 12, wherein the electric motor is a motor generator.

16. A hybrid vehicle control apparatus as defined in claim 1,
wherein the continuously variable transmission has a torque converter, and
wherein the electric motor is contained together with the torque converter within a converter housing, and is disposed on an outer peripheral portion of a front cover of the torque converter, and a rotor of the electric motor is connected to the front cover and an output shaft of the internal combustion engine.

17. A hybrid vehicle control apparatus as defined in claim 16, wherein the electric motor is a motor generator.

18. A hybrid vehicle control apparatus as defined in claim 1, wherein the electric motor is a motor generator.

* * * * *